(12) United States Patent  
Schrepp et al.

(10) Patent No.: US 7,610,303 B2  
(45) Date of Patent: Oct. 27, 2009

(54) INPUT CONTROL FOR IDENTIFYING OBJECTS

(75) Inventors: Martin Schrepp, Hockenheim (DE); Wolfgang Trunz, Karlsdorf-Neuthard (DE); Sultan Ucar, Rauenberg (DE); Barbara Jochum, Muehlhausen (DE); Carmen Oestringer, Mannheim (DE); Martin Dauer, Alsting (FR); Ingo Deck, Mannheim (DE); Markus Kupke, Dielheim (DE); Volker Mueller, Karlsruhe (DE)

(73) Assignee: SAP AG, Walldorf ( * ) Notice: Subject to any disclaimer, the term of this patent is extended or adjusted under 35 U.S.C. 154(b) by 279 days.

(21) Appl. No.: 11/229,151

(22) Filed: Sep. 16, 2005

(65) Prior Publication Data

US 2006/0080302 A1  Apr. 13, 2006

Related U.S. Application Data

(60) Provisional application No. 60/617,421, filed on Oct. 8, 2004.

(51) Int. Cl.  
*G06F 7/00* (2006.01)  
*G06F 17/00* (2006.01)

(52) U.S. Cl. ............... 707/102; 707/103 R; 707/103 Y; 345/619

(58) Field of Classification Search .................. 715/777; 707/1–206; 345/619  
See application file for complete search history.

(56) References Cited

U.S. PATENT DOCUMENTS

| | | | |
|---|---|---|---|
| 5,737,591 A | 4/1998 | Kaplan et al. | ............... 395/601 |
| 5,963,938 A | 10/1999 | Wilson et al. | .................. 707/4 |
| 6,185,588 B1 | 2/2001 | Olson-Williams et al. | ... 707/515 |
| 6,466,241 B1 | 10/2002 | Schindler | ..................... 345/854 |

(Continued)

FOREIGN PATENT DOCUMENTS

GB  2363044  12/2001

(Continued)

OTHER PUBLICATIONS

Description of the "recently used file list" in Micrsoft Word, printed form the "Help" menu, Jan. 15, 2004.

(Continued)

*Primary Examiner*—Mohammad Ali  
*Assistant Examiner*—Angelica Ruiz  
(74) *Attorney, Agent, or Firm*—Fish & Richardson P.C.

(57) ABSTRACT

In a computer system having several application programs, wherein each application program is configured to manage at least one of several object types, a method of identifying objects includes receiving a first input that a user makes under guidance of an input control in a graphical user interface (GUI) to specify 1) a user-selected object type, 2) a user-selected attribute that is associated with the user-selected object type, and 3) a user-selected attribute value for the user-selected attribute. The method includes executing a search in the computer system for any objects corresponding to the first input. The method includes initiating a first application program that is configured to manage objects of the user-selected object type, wherein the first application program presents a result of the search in the GUI. The input control may remain visible with the application, for executing a new search for the same or another object type.

17 Claims, 5 Drawing Sheets

U.S. PATENT DOCUMENTS

| | | | |
|---|---|---|---|
| 7,165,221 B2 * | 1/2007 | Monteleone et al. | 715/738 |
| 2002/0147709 A1 * | 10/2002 | Rajarajan et al. | 707/3 |
| 2003/0229631 A1 | 12/2003 | Arend et al. | 703/3 |

FOREIGN PATENT DOCUMENTS

| | | |
|---|---|---|
| WO | WO 01/13266 | 2/2001 |
| WO | WO 02/103576 | 12/2002 |

OTHER PUBLICATIONS

Description of the AutoReport function in Microsoft Access, printed from the "Help" menu, Jan. 15, 2004.

http://www.sap.info/public/en/article.php4/comvArticle-193333c63b489e3d93/en, "Product management business scenario", Nov. 24, 1999.

Neibauer, "Part V—Bending Folders to Your Will," *Running Microsoft Outlook 2000 (The Complete Reference Made by Microsoft to Help You Be More Productive)*, 1999, Microsoft Press, Redmond, WA, pp. 470-478.

Printout of "Events" screen from computer program available from ProLaw Software, Albuquerque, NM, 1 pag, Sep. 2004.

* cited by examiner

FIG. 2

| Search | ▶ | Accounts | ▶ | by | Name | ▶ | Ad* | Go |

Home | Activities | Account Management | Acquisition | Sales | Products | Analysis Overview | Accounts | Contacts | Price Lists

Detailed Navigation

Overview
☐ Accounts
  List
  Details
  Summary
Contact Person
Fact Sheet Summary

Accounts

Show [ ▶ ]  [Save] [Edit List]  [Open Advanced Search]
[New...]  [Add to Favorites]

| Name | House | Street | City | Pst Code | Partner | Telephone | Std Contact |
|---|---|---|---|---|---|---|---|
| Adclip Network | 252 | Cedar Street | Boston | 02101 | Scott Green | 610-404-4644 | Scott Green |
| Adco Equipment | 165 | West 87th | New York | 10001 | Peter Johnson | 212-495-2346 | Peter Johnson |
| Adcorps Associates | 31 | Oleander Drive | New York | 10001 | Peter Johnson | 212-495-2346 | Peter Johnson |
| Adcom Computer | 213 | East 45th | New York | 10001 | Mia Barnes | 122-432-2346 | Mia Barnes |
| Adecor Systems | 1242 | Manhattan Ave. | New York | 10001 | Peter Johnson | 212-495-2346 | Peter Johnson |
| Advance Automatic | 89 | Pines Street | Boston | 02101 | Peter Johnson | 212-495-2346 | Peter Johnson |

6 Items      ▼ Page [ 1 ] of 1 ▲

INPUT CONTROL FOR IDENTIFYING OBJECTS

CROSS-REFERENCE TO RELATED APPLICATION

This application claims priority from U.S. Provisional Application No. 60/617,421, filed Oct. 8, 2004 and entitled "Sales Manager," the entire contents of which are incorporated herein by reference.

TECHNICAL FIELD

The description relates to identifying objects using an input control for a user to specify an object type, an attribute and an attribute value.

BACKGROUND

Many computer systems include repositories or other storage facilities for holding objects. The systems typically provide some search functionality for a user to identify the object(s) that the user is interested in. For example, a customer relationship management (CRM) solution may offer many different types of business objects to a system user (accounts, products, activities, marketing plans, etc.) There may be many object instances stored in the repository for each object type.

Searching for existing data (for example account data, running marketing plans, etc) is an important task for a user. Some systems include objects of several different types, where each object type is managed by a separate application program. Such systems may be configured such that the user must first initiate the application program associated with the type of the sought object(s). The initiated application program provides a search function for identifying objects of the type associated with the program. If the user thereafter wishes to search for objects of a different type, perhaps upon discovering that the initiated application was not the correct one, the user must initiate the right application before entering and executing the new search.

SUMMARY

The invention relates to identifying objects using an input control with which a user can specify an object type, an attribute and an attribute value.

In a first general aspect, the invention comprises a method of identifying objects. The method comprises receiving, in a computer system, a first input that a user makes under guidance of an input control in a graphical user interface (GUI). The first input is made to specify 1) a user-selected object type, 2) a user-selected attribute that is associated with the user-selected object type, and 3) a user-selected attribute value for the user-selected attribute. The method comprises executing a search in the computer system for any objects corresponding to the first input. The method comprises initiating a first application program that is configured to manage objects of the user-selected object type. The first application program is selected from several application programs, wherein each application program is configured to manage at least one of several object types. The first application program presents a result of the search in the GUI.

Embodiments may include any or all of the following features. The input control may remain visible in the GUI after the first application program is initiated, and a second input may be made under guidance of the input control after the first application program is initiated. The second input may specify a new search relating to a different user-selected object type that the first application program is not configured to manage, and the method may further comprise executing the new search and initiating a second application program that is configured to manage objects of the different user-selected object type, wherein the second application program presents a result of the new search in the GUI. The first application program may execute the search upon being initiated. Upon receiving the first input the computer system may use the user-selected object type to identify the first application program for initiation and forward the user-selected attribute and the user-selected attribute value to the first application program. The results may comprise at least one object corresponding to the first input and the first application program may provide that the user can edit the at least one object in the GUI. The GUI may be generated by a portal in the computer system from which portal any of the several application programs can be initiated. Upon receiving the user-selected object type the computer system may identify a set of attributes associated with the user-selected object type, and the computer system may populate the input control with the set of attributes for the user to select between. The computer system may identify the set of attributes from a table that specifies which attributes are associated with each of the several object types. The computer system may identify the set of attributes by requesting that the first application program identify the set of attributes associated with the user-selected object type.

In a second general aspect, the invention comprises a computer program product tangibly embodied in an information carrier, the computer program product comprising instructions that, when executed, generate on a display device a graphical user interface (GUI) for identifying objects. The GUI comprises an input control to guide a user in making an input. The input specifies 1) a user-selected object type, 2) a user-selected attribute that is associated with the user-selected object type, and 3) a user-selected attribute value for the user-selected attribute. Upon receiving the input the computer system executes a search for any objects corresponding to the input and initiates a first application program that is configured to manage objects of the user-selected object type. The first application program is selected from several application programs, each application program configured to manage at least one of several object types. The first application program presents a result of the search in the GUI.

Embodiments may include any or all of the following features. The input control may remain visible in the GUI after the first application program is initiated, and a second input may be made under guidance of the input control after the first application program is initiated. The second input may specify a new search relating to a different user-selected object type that the first application program is not configured to manage, the new search may be executed and a second application program that is configured to manage objects of the different user-selected object type may be initiated, wherein the second application program presents a result of the new search in the GUI. The results may comprise at least one object corresponding to the first input and the first application program may provide that the user can edit the at least one object in the GUI. The GUI may be generated by a portal in the computer system from which portal any of the several application programs can be initiated. Upon receiving the user-selected object type the computer system may identify a set of attributes associated with the user-selected object type, and the computer system may populate the input control with the set of attributes for the user to select between.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 2 shows results of a search being presented in the GUI of FIG. 1;

Like reference numerals in the various drawings indicate like elements.

DETAILED DESCRIPTION

Figure 1:
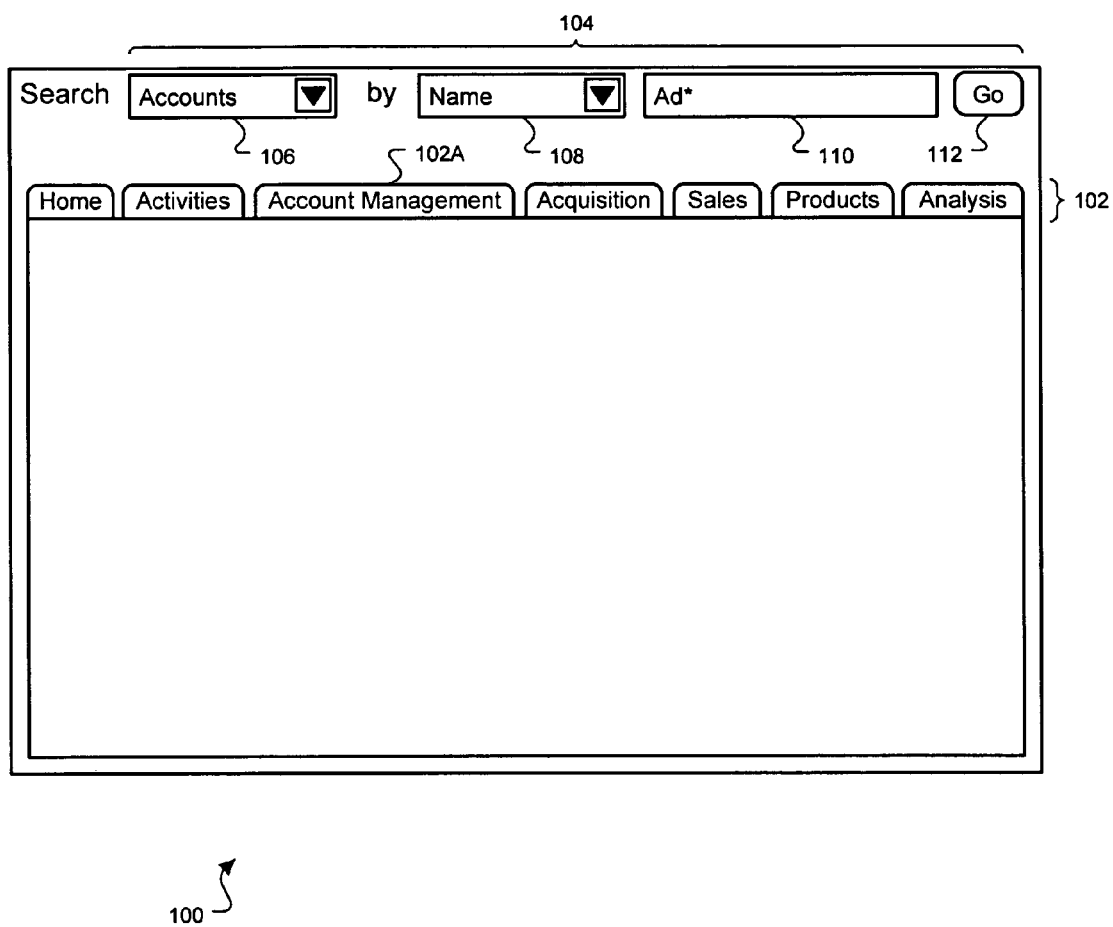
FIG. 1 shows a graphical user interface (GUI) for identifying objects.

FIG. 1 shows a graphical user interface (GUI) 100 that can be used in searching for objects of any of several object types, wherein each object type is managed by one of several application programs. Particularly, the GUI 100 provides an input control for guiding a user in specifying an object type, an attribute associated with the object type, and an attribute value for executing a search. The application program that is configured to manage objects of the selected object type is initiated and presents a result of the search in the GUI. The GUI 100 may be generated in any of several forms, including a web-based form displayable in a browser.

The GUI includes several tabs 102 associated with application programs (e.g. Account Management 102A) that can be executed in the computer system. The tabs 102 can be used for initiating one or more of the application programs when the user knows which program he or she needs. Particularly, the user may know which object type(s) a given application program handles and therefore initiate it to gain access to the objects. In contrast, a user who does not know which application program handles the sought object type can launch a search for the specified object(s) using an input control 104, without first having to initiate any of the application programs.

Input control 104 includes an object type field 106, an attribute field 108, an attribute value field 110, and a Go button 112. The input control 104 may restrict data entry to item(s) selected from a list of valid values. For example, the object type field 106 and the attribute field 108 may include pull-down lists of valid object types and attributes, respectively. In another example, the attribute field 108 pull-down list may contain only those attributes corresponding to the object type that a user has selected. A user can initiate a search on the parameters specified in the input controls 104 by selecting the Go button 112. The application program that is associated with the selected object type displays the results of the search in the GUI 100.

Here, the user has selected "Accounts" in the object type field 106, "Name" in the attribute field 108, and attribute value "Ad*" in the attribute value field 110. The "*" is a wildcard character. Upon the user selecting the Go button 112, the computer system performs a search for any object(s) of the type Accounts having a value beginning with "Ad" in the Name attribute, and initiates the application associated with Accounts type objects for displaying the results.

In another implementation, it is the application program for the selected object type that executes the search upon being initiated. For example, the computer system identifies the application, Account Management, as being associated with the selected object type "Accounts", initiates that application and forwards the selected attribute "Name" and the attribute value "Ad*" to the application. The Account Management application performs the search using the forwarded parameters and presents the results in the GUI 100.

FIG. 2 shows the GUI 100 upon the Account Management application presenting the results of the search. The Account Management tab 102A in the GUI 100 assumes a selected state upon the initiation of the Account Management application. The application tabs 102 may contain sub-tabs 202 associated with the respective object types that the application can manage. In the GUI 100 of FIG. 2, the Account Management application presents the objects having the Accounts object type on an Accounts sub-tab 202A. The Accounts sub-tab 202A is selected when the Account Management application presents a set 204 of results resulting from the search on the Accounts object type. If the search yields one or more objects satisfying the search parameters, the application program presents the object(s) in the results set 204. In the GUI 100, the user may perform operations on any or all of the listed objects according to the functionality of the particular application. For example, the user may edit object data presented in the results set 204, such as the data of an exemplary object 206. Here, the user may edit a City field 208 or a Name field 210, for example.

The input control 104 remains visible after the Account Management application program has been initiated. Thus, while the Accounts Management application is visible the user can use the control 104 to initiate a different search for objects having the Account object type, and the Account Management application program will display the results of the different search. As another example, while the Accounts Management application is visible the user can initiate a search for objects having a different object type that is managed by another application program and not by the Accounts Management application program. The results of such a search will be displayed by the other application program. For example, the particular attribute and attribute value(s) of the new search can be forwarded to the other application which then initiates the search. Upon being initiated, the other application program may replace the present application program in a same window of the GUI 100. In contrast, if the system detects that there are unsaved changes in any of the objects currently displayed by the present application program, the system may automatically initiate the other application program in a new window of the GUI 100.

Figure 3:
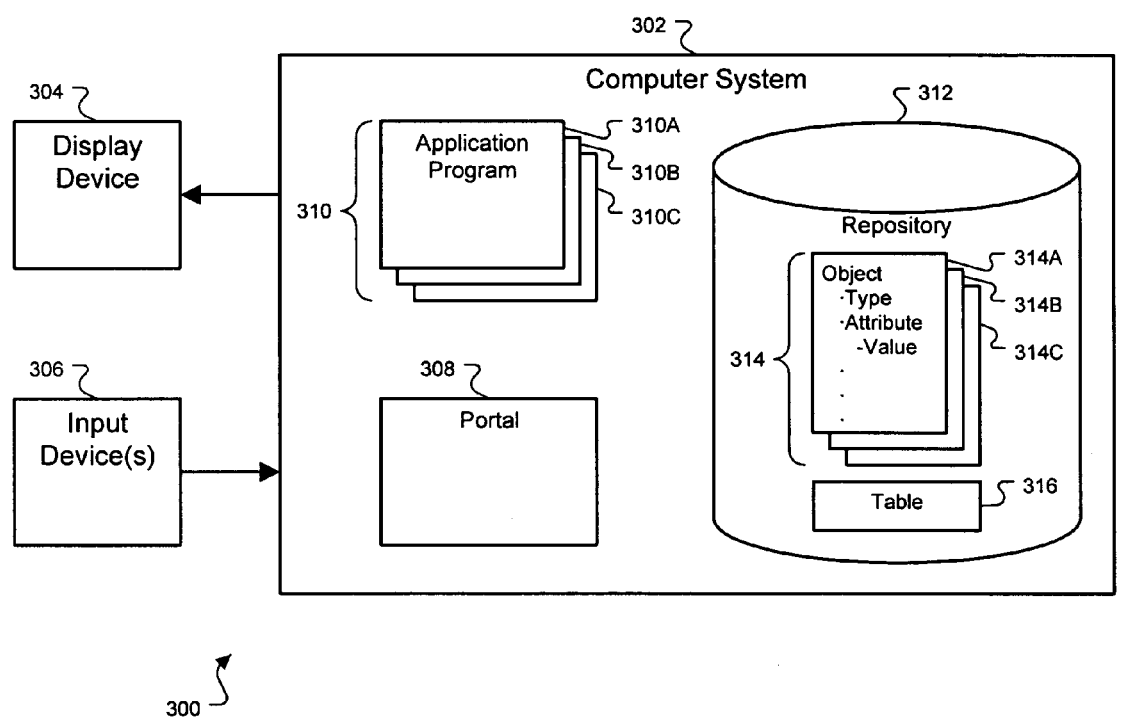
FIG. 3 is a block diagram of a system where a user can initiate a search to identify objects.

FIG. 3 shows a system 300 having a computer system 302, a display device 304, and one or more input device(s) 306. The computer system 302 includes a portal 308 that can generate the GUI 100 of FIGS. 1 and 2 on the display device 304. The user may perform a search by making an input using the input device(s) 306, under guidance of the input control 104 of FIGS. 1 and 2. In addition, the computer system 302 includes application programs 310 that can be executed. In this example, the portal 308 is capable of initiating any or all of the application programs 310.

The computer system 302 also includes a repository 312 that stores objects 314. Each object 314A, 314B, and 314C is of a specific object type and includes at least one attribute associated with an attribute value. Each application program 310A, 310B, and 310C is configured to manage one or more object types. The portal 308 may use the object type selected in the object type field 106 of the input control 104 to determine which of the application programs 310 to initiate when the user initiates the search.

The portal 308 provides the input control 104 of FIGS. 1 and 2 for presentation on the display device 304. A user can enter search criteria, and initiate the search, using the input device(s) 306. The portal 308 can look up the selected object type in a table 316, contained in the repository 312, to determine which application program is responsible for that object type. As another example, the portal 308 can prompt the application programs 310 to report their respective object types to the portal 308. This lets the portal 308 determine the application program responsible for the selected object type. When the portal 308 identifies the correct application program, the search can be initiated and the application program can display the results 204. In one implementation, the portal 308 invokes the application program, which then executes the search and thereafter displays the results 204.

Figure 4:
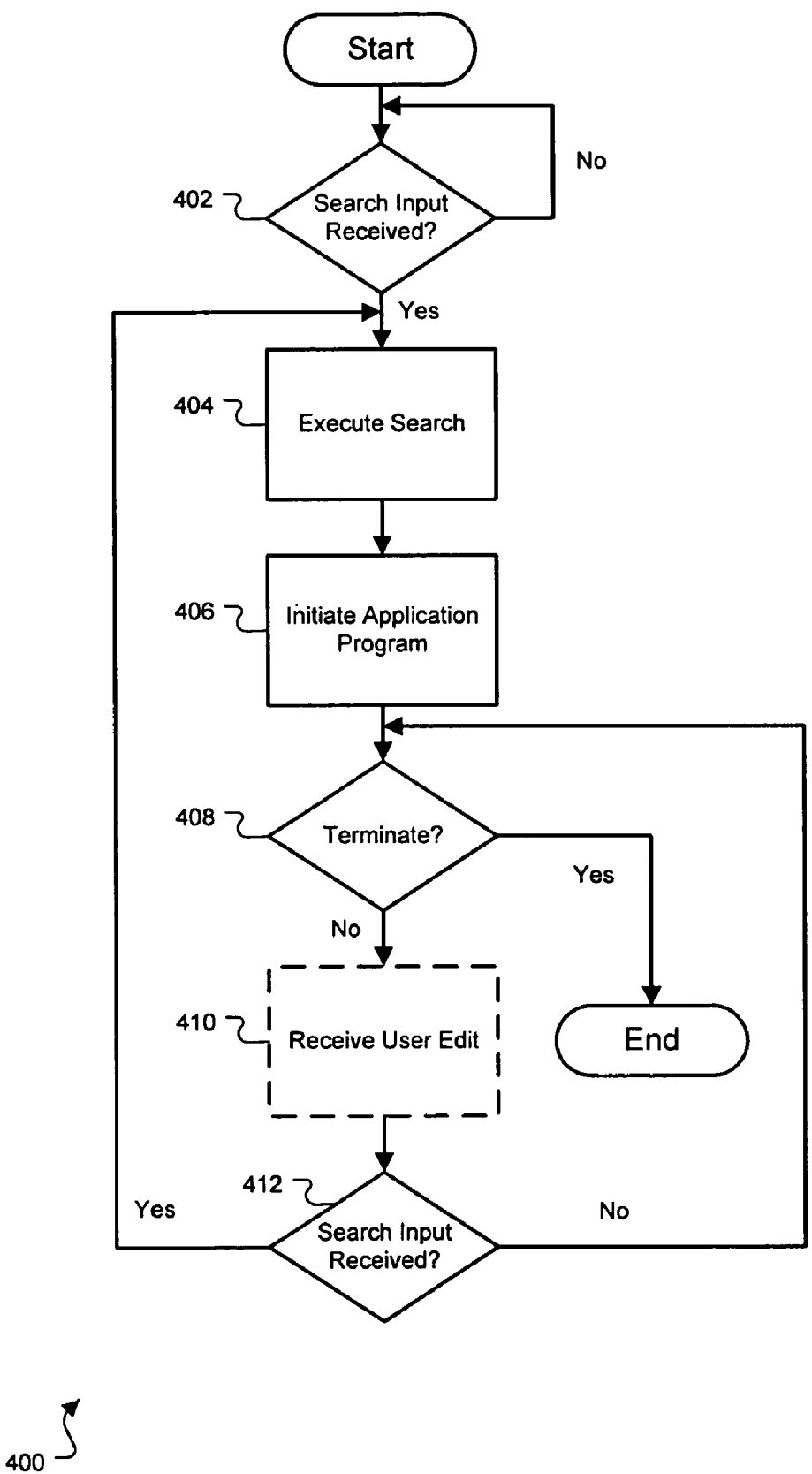
FIG. 4 is a flow chart of exemplary operations that a system may perform to identify objects.

FIG. 4 is a flow chart of exemplary operations 400 that the system 300 can perform. A processor executing instructions stored in a computer program product can perform the operations 400. The operations 400 begin, in step 402, with querying whether a user has made an input in a GUI. The user can make the input under guidance of an input control, which includes fields for receiving an object type, an attribute associated with the object type, and an attribute value for the attribute. The operations 400 remain at step 402 until a search input is received. For example, in the GUI 100 of FIG. 1, a user may select an object type, an attribute, and enter an attribute value using the input control 104. The user may request that a search be performed by selecting the Go button 112.

If a user input is received, a search is executed in step 404 for any objects corresponding to the user input. For example, in the system 300 of FIG. 3, the portal 308 performs a search of the objects 314 in the repository 312 using the search criteria in the input control 104. As another example, one of the application programs 310 that manages the selected object type can initiate the search.

In step 406, an application program is initiated that is configured to manage objects of the selected object type. The application program presents a result of the search in the GUI. For example, the portal 308 in FIG. 3 initiates the Account Management application that displays the set 204 of results in the GUI 100 of FIG. 2. In some implementations, step 406 may occur before step 404. For example, if the application program is to perform a search, the portal 308 initiates the application program before the application program performs the search.

In step 408, the operations 400 may terminate. For example, a user may instruct the application program to terminate or the portal 308 may terminate the application program according to predefined instructions.

If the operations 400 do not terminate in step 408, in optional step 410, the application program provides that the user can edit objects in the GUI resulting from the search. For example, in the GUI 100 of FIG. 2, the Account Management application program can receive user edits of the Name field 210 and the City field 208.

In step 412, it is queried whether another search input has been received, similar to step 402 described above. The search input control remains visible in the GUI after the application program is initiated and the user may enter another search input to be executed. The new search may involve the same application program or may initiate another application program. If another search input is received, the process flow returns to step 404. The operations 400 may repeat steps 408, 410 and 412 as above until a search input is received in step 412.

Figure 5:
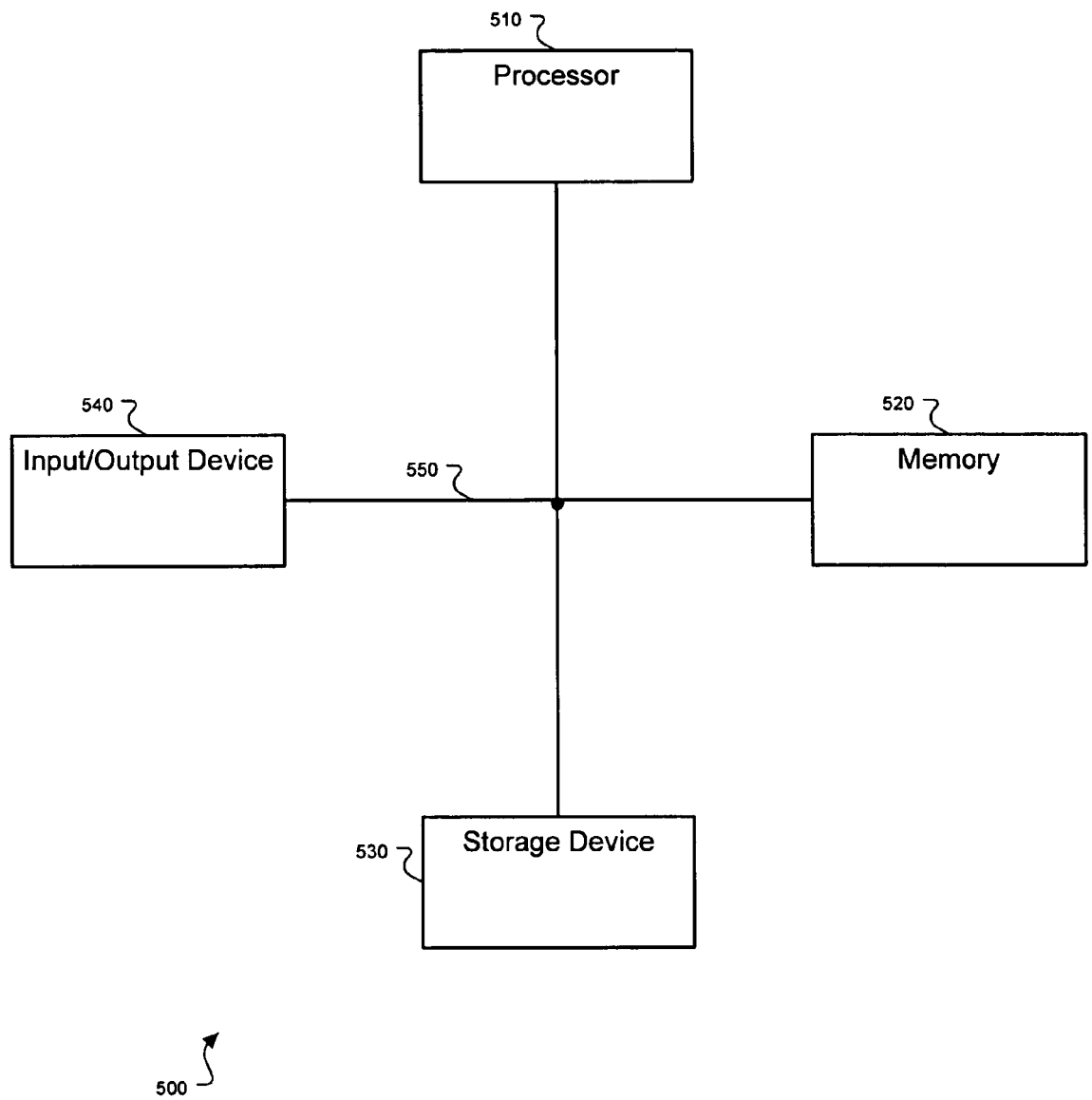
FIG. 5 is a block diagram of a general computer system.

FIG. 5 is a block diagram of a computer system 500 that can be used in the operations described above, according to one embodiment. For example, the system 500 may be included in the system 300 of FIG. 3.

The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. In one embodiment, the processor 510 is a single-threaded processor. In another embodiment, the processor 510 is a multi-threaded processor. The processor 510 is capable of processing instructions stored in the memory 520 or on the storage device 530 to display graphical information for a user interface on the input/output device 540.

The memory 520 stores information within the system 500. In one embodiment, the memory 520 is a computer-readable medium. In one embodiment, the memory 520 is a volatile memory unit. In another embodiment, the memory 520 is a non-volatile memory unit.

The storage device 530 is capable of providing mass storage for the system 500. In one embodiment, the storage device 530 is a computer-readable medium. In various different embodiments, the storage device 530 may be a floppy disk device, a hard disk device, an optical disk device, or a tape device.

The input/output device 540 provides input/output operations for the system 500. In one embodiment, the input/output device 540 includes a keyboard and/or pointing device. In one embodiment, the input/output device 540 includes a display unit for displaying graphical user interfaces.

The invention can be implemented in digital electronic circuitry, or in computer hardware, firmware, software, or in combinations of them. Apparatus of the invention can be implemented in a computer program product tangibly embodied in an information carrier, e.g., in a machine-readable storage device or in a propagated signal, for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The invention can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Accordingly, other embodiments are within the scope of the following claims.

What is claimed is:

1. A method of identifying objects comprising:
receiving, in a computer system, a first input that a user makes under guidance of a search application that is external to each of multiple application programs in the computer system, the search application generating a graphical user interface (GUI) that comprises 1) a first input control for specifying a user-selected object type having a plurality of attributes associated therewith, wherein each object type is managed by one of the multiple application programs, 2) a second input control for specifying a user-selected attribute that is associated with the user-selected object type, the user-selected attribute selected from among the plurality of attributes associated with the user-selected object type, 3) a third input control for specifying a user-selected attribute value for the user-selected attribute, wherein the first input includes at least the user-selected object type, the user-selected attribute and the user-selected attribute value, and 4) a plurality of fourth input controls each corresponding to one of the multiple application programs and configured for a user to initiate the application program directly using the fourth input control, the plurality of fourth input controls being presented in the search application both while none of the plurality of applications has been initiated and also when at least one of the plurality of applications has been initiated;

executing, using the search application, a search in the computer system for any objects corresponding to the user-selected object type while an application program associated with the selected object type is not initiated; and initiating, in response to the first input and in lieu of the user activating any of the plurality of fourth input controls, a first application program that generates output and that is configured to manage objects of the user-selected object type, the first application program being selected from the multiple application programs based on the user-selected object type, each application program configured to manage at least one of several object types, wherein the first application program presents a result of the search in the GUI.

2. The method of claim 1, wherein the first, second, and third input controls remains visible in the GUI after the first application program is initiated, and wherein a second input is made under guidance of the first, second, and third input controls after the first application program is initiated.

3. The method of claim 2, wherein the second input specifies a new search relating to a different user-selected object type that the first application program is not configured to manage, further comprising executing the new search and initiating a second application program that is configured to manage objects of the different user-selected object type, wherein the second application program presents a result of the new search in the GUI.

4. The method of claim 1, wherein the first application program executes the search upon being initiated.

5. The method of claim 4, wherein upon receiving the first input the computer system uses the user-selected object type to identify the first application program for initiation and forwards the user-selected attribute and the user-selected attribute value to the first application program.

6. The method of claim 1, wherein the results comprise at least one object of the user-selected object type having the user-selected attribute value associated with the user-selected attribute, and wherein the first application program provides that the user can edit the at least one object in the GUI.

7. The method of claim 1, wherein the GUI is generated by a portal in the computer system from which portal any of the several application programs can be initiated.

8. The method of claim 1, wherein upon receiving the user-selected object type the computer system identifies a set of attributes associated with the user-selected object type, and wherein the computer system populates the input control with the set of attributes for the user to select between.

9. The method of claim 8, wherein the computer system identifies the set of attributes from a table that specifies which attributes are associated with each of the several object types.

10. The method of claim 8, wherein the computer system identifies the set of attributes by requesting that the first application program identify the set of attributes associated with the user-selected object type.

11. A computer program product tangibly embodied in a computer-readable storage medium, the computer program product including instructions that, when executed, cause a processor to perform operations comprising:
receiving a first input that a user makes under guidance of a search application that is external to each of multiple application programs in the computer system, the search application generating a graphical user interface (GUI) that comprises 1) a first input control for specifying a user-selected object type having a plurality of attributes associated therewith, wherein each object type is managed by one of the multiple application programs, 2) a second input control for specifying a user-selected attribute that is associated with the user-selected object type, the user-selected attribute selected from among the plurality of attributes associated with the user-selected object type, 3) a third input control for specifying a user-selected attribute value for the user-selected attribute, wherein the first input includes at least the user-selected object type, the user-selected attribute and the user-selected attribute value, and 4) a plurality of fourth input controls each corresponding to one of the multiple application programs and configured for a user to initiate the application program directly using the fourth input control, the plurality of fourth input controls being presented in the search application both while none of the plurality of applications has been initiated and also when at least one of the plurality of applications has been initiated;

executing, using the search application, a search in the computer system for any objects corresponding to the user-selected object type while an application program associated with the selected object type is not initiated; and initiating, in response to the first input and in lieu of the user activating any of the plurality of fourth input controls, a first application program that generates output and that is configured to manage objects of the user-selected object type, the first application program being selected from the multiple application programs based on user-selected object type, each application program configured to manage at least one of several object types, wherein the first application program presents a result of the search in the GUI.

12. A computer program product tangibly embodied in an a computer-readable storage medium, the computer program product comprising instructions that, when executed, generate on a display device a graphical user interface (GUI) for identifying objects in a computer system, the GUI comprising:

a first input control to guide a user in making an input that specifies a user-selected object type having a plurality of attributes associated therewith, wherein each object type is managed by one of multiple application programs;

a second input control to guide a user in making an input that specifies a user-selected attribute that is associated with the user-selected object type, the user-selected attribute selected from among the plurality of attributes associated with the user-selected object type;

a third input control to guide a user in making an input that specifies a user-selected attribute value for the user-selected attribute;

a plurality of fourth input controls to guide a user in making an input that initiates one of multiple application programs; and wherein upon receiving the inputs, the computer system executes a search, using the search application, for any objects corresponding to the user-selected object type while an application program associated with the selected object type is not initiated and initiates, in response to the first input and in lieu of the user activating any of the plurality of fourth input controls, a first application program that generates output and that is configured to manage objects of the user-selected object type, the first application program being selected from the multiple application programs based on the user-selected object type, each application program configured to manage at least one of several object types, the first application program presenting a result of the search in the GUI.

13. The computer program product of claim 12, wherein the first, second, third, and fourth input controls remain visible in the GUI after the first application program is initiated, and wherein a second input is made under guidance of the first, second, and third input controls after the first application program is initiated.

14. The computer program product of claim 13, wherein the second input specifies a new search relating to a different user-selected object type that the first application program is not configured to manage, further comprising executing the new search and initiating a second application program that is configured to manage objects of the different user-selected object type, wherein the second application program presents a result of the new search in the GUI.

15. The computer program product of claim 12, wherein the results comprise at least one object of the user-selected object type having the user-selected attribute value associated with the user-selected attribute, and wherein the first application program provides that the user can edit the at least one object in the GUI.

16. The computer program product of claim 12, wherein the GUI is generated by a portal in the computer system from which portal any of the several application programs can be initiated.

17. The computer program product of claim 12, wherein upon receiving the user-selected object type the computer system identifies a set of attributes associated with the user-selected object type, and wherein the computer system populates the second input control with the set of attributes for the user to select between.

* * * * *

UNITED STATES PATENT AND TRADEMARK OFFICE
CERTIFICATE OF CORRECTION

PATENT NO. : 7,610,303 B2  Page 1 of 1
APPLICATION NO. : 11/229151
DATED : October 27, 2009
INVENTOR(S) : Schrepp et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 481 days.

Signed and Sealed this

Twelfth Day of October, 2010

David J. Kappos
*Director of the United States Patent and Trademark Office*